United States Patent
Kang et al.

(10) Patent No.: US 8,948,075 B2
(45) Date of Patent: Feb. 3, 2015

(54) APPARATUS AND METHOD FOR SUPPORTING DIFFERENT SYSTEM IN A BROADBAND WIRELESS COMMUNICATION SYSTEM USING MULTI-HOP RELAY SCHEME

(75) Inventors: Hyun-Jeong Kang, Seoul (KR); Taori Rakesh, Suwon-si (KR); Young-Bin Chang, Anyang-si (KR); Jung-Je Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1097 days.

(21) Appl. No.: 12/419,746

(22) Filed: Apr. 7, 2009

(65) Prior Publication Data

US 2009/0252083 A1 Oct. 8, 2009

(30) Foreign Application Priority Data

Apr. 7, 2008 (KR) .................. 10-2008-0032393

(51) Int. Cl.
| | |
|---|---|
| *H04B 7/14* | (2006.01) |
| *H04W 72/04* | (2009.01) |
| *H04B 7/26* | (2006.01) |
| *H04W 16/26* | (2009.01) |
| *H04W 84/04* | (2009.01) |

(52) U.S. Cl.
CPC ......... *H04W 72/0493* (2013.01); *H04B 7/2606* (2013.01); *H04W 16/26* (2013.01); *H04W 84/047* (2013.01)
USPC ............ 370/315; 370/328; 370/329; 455/428

(58) Field of Classification Search
CPC .................................................. H04W 72/0493
USPC .................. 370/329, 335, 315; 455/7, 15, 16
See application file for complete search history.

(56) References Cited

U.S. PATENT DOCUMENTS

| | | | |
|---|---|---|---|
| 7,885,214 B2* | 2/2011 | Ahmadi et al. | ............... 370/295 |
| 2007/0060050 A1 | 3/2007 | Lee et al. | |

(Continued)

FOREIGN PATENT DOCUMENTS

| | | |
|---|---|---|
| CN | 1988411 A | 6/2007 |
| EP | 1848165 A2 | 10/2007 |
| EP | 1855428 A2 | 11/2007 |

(Continued)

OTHER PUBLICATIONS

Sassan Ahmadi et al., "Relay Support Considerations in IEEE 802.16m Frame Structure Design", Jan. 18, 2008, pp. 1-7, vol. 802.16m, No. r2.

(Continued)

*Primary Examiner* — Donald Mills
*Assistant Examiner* — Henry Baron
(74) *Attorney, Agent, or Firm* — Jefferson IP Law, LLP

(57) ABSTRACT

An apparatus and method for supporting a different system in a broadband wireless communication system using a multi-hop relay scheme are provided. A DownLink/UpLink (DL/UL) frame of a Base Station (BS) includes a legacy access zone for communicating with a legacy Mobile Station (MS), a relay zone for communicating with a legacy Relay Station (RS), and a new zone for communicating with a new MS. A DL/UL frame of an RS includes a legacy access zone for communicating with a legacy MS and a legacy relay zone for communicating with a new BS by legacy standards.

15 Claims, 15 Drawing Sheets

(56) References Cited

U.S. PATENT DOCUMENTS

2007/0281613 A1* 12/2007 Lee et al. ............... 455/15
2011/0096715 A1* 4/2011 Park et al. ............... 370/315

FOREIGN PATENT DOCUMENTS

| KR | 10-2007-0031173 A | 3/2007 |
| KR | 10-2007-0109812 A | 11/2007 |
| KR | 100855225 B1 | 8/2008 |
| WO | 2007/100232 A1 | 9/2007 |
| WO | 2007100232 A1 | 9/2007 |
| WO | 2009145484 A2 | 12/2009 |

OTHER PUBLICATIONS

"IEEE 802.16m RElay Frame Structure with Legacy Support", Mar. 16, 2008, pp. 1-4, vol. 802.16m.

"Proposal for IEEE 802.16m Frame Structure for Relay Support" Jan. 16, 2008, pp. 1-8, vol. 802.16m.

Sassan Ahmadi et al., "Proposed 802.16m Frame Structure Baseline Content Suitable for Use in the 802.16m SDD", Mar. 3, 2008, pp. 1-13, vol. 802.16m, No. r4.

* cited by examiner

APPARATUS AND METHOD FOR SUPPORTING DIFFERENT SYSTEM IN A BROADBAND WIRELESS COMMUNICATION SYSTEM USING MULTI-HOP RELAY SCHEME

PRIORITY

This application claims the benefit under 35 U.S.C. §119(a) of a Korean patent application filed in the Korean Intellectual Property Office on Apr. 7, 2008 and assigned Serial No. 10-2008-0032393, the entire disclosure of which is hereby incorporated by reference.

BACKGROUND OF THE INVENTION

1. Field of the Invention

The present invention relates to an apparatus and method for supporting a different system in a broadband wireless communication system using a multi-hop relay scheme. More particularly, the present invention relates to a frame communication apparatus and method for supporting a different system.

2. Description of the Related Art

In a 4$^{th}$ Generation (4G) communication system, which is a next generation communication system, research is being conducted to provide users with services having various Qualities-of-Service (QoSs) at a data rate of about 100 Mbps. In particular, the 4G communication system is evolving to guarantee mobility and QoS for a Broadband Wireless Access (BWA) communication system such as a wireless Local Area Network (LAN) system and a wireless Metropolitan Area Network (MAN) system. An exemplary BWA communication system is a communication system based on the Institute of Electrical and Electronics Engineers (IEEE) 802.16d standard and IEEE 802.16e standard.

The IEEE 802.16d communication system and IEEE 802.16e communication system use an Orthogonal Frequency Division Multiplexing (OFDM)/Orthogonal Frequency Division Multiple Access (OFDMA) scheme for a physical channel.

In a conventional IEEE 802.16e communication system, signaling transmission/reception is implemented through a direct link between a fixed Base Station (BS) and a Mobile Station (MS) and thus, a wireless communication link with high reliability can be easily configured between the BS and the MS. However, in the IEEE 802.16e communication system, because the BS is fixed in position, flexibility in wireless network configuration is low. Thus, it is difficult to provide an efficient communication service in a wireless environment that experiences significant changes in traffic distribution or required calls.

In order to overcome this disadvantage, a fixed Relay Station (RS), a mobile RS, or a general MS is used to apply a multi-hop relay type data forward scheme to a general cellular wireless communication system such as the IEEE 802.16e communication system. The wireless communication system using the multi-hop relay scheme can rapidly adapt to changes in a communication environment, can more easily reconfigure a network, and can more efficiently manage the wireless network. For example, the wireless communication system using the multi-hop relay scheme can extend a cell service area and enhance a system capacity. That is, if a channel state between a BS and an MS is poor, an RS is installed between the BS and the MS, thus configuring a multi-hop relay path through the RS and providing a wireless channel having an improved channel state to the MS. Also, by using the multi-hop relay scheme in a cell boundary area where a channel state from a BS is poor, the wireless communication system can provide a higher-speed data channel, and can extend a cell service area.

The wireless communication system using the multi-hop relay scheme can be, for example, an IEEE 802.16j communication system.

FIG. 1 is a schematic diagram illustrating a construction and frame structure of a conventional IEEE 802.16j communication system.

Referring to FIG. 1, a BS (i.e., a 16 Multi-hop Relay Base Station (16 MR-BS)) can use a relay service of an RS (16j RS) so as to provide a communication service to an MS (16e MS) that is out of its own service area. In order to provide such a relay service, a physical frame structure, indicating if a BS, an RS, and an MS have to transmit/receive data at any time, should be defined.

As illustrated in FIG. 1, a DownLink (DL) subframe and UpLink (UL) subframe of a BS are each comprised of an access zone and a relay zone. In the access zone of the DL subframe, a BS or RS transmits data to an MS. In the relay zone of the DL subframe, the BS transmits DL data, necessary to provide the MS with a relay service, to the RS. In the access zone of the UL subframe, the MS transmits data to the BS or RS. In the relay zone of the UL subframe, the RS transmits UL data, necessary to provide the MS with a relay service, to the BS.

The aforementioned system of FIG. 1 is possible in a case where a BS, an RS, and an MS all follow the same wireless system. However, a data transmission method of FIG. 1 cannot be used in a case where even any one of the BS, RS, and MS follows two or more wireless systems.

In general, communication systems are evolving by providing a high-speed data service as compared to a legacy system and solving issues on realization through a change of standards, etc. In this evolution process, a variety of systems can coexist within the same area depending on the degree of compatibility with a legacy system. For example, a new system that is more advanced than a legacy system can be installed in an area where an IEEE 802.16e system (i.e., a legacy system) is installed. The new system may support all services for a new MS as well as a legacy MS. In other words, there is a need for a frame structure that, if an MS following a legacy system and an MS following a new system coexist, can support a service of both MSs.

SUMMARY OF THE INVENTION

An aspect of the present invention is to address at least the above-mentioned problems and/or disadvantages and to provide at least the advantages described below. Accordingly, an aspect of the present invention is to provide an apparatus and method for supporting a different system in a broadband wireless communication system using a multi-hop relay scheme.

Another aspect of the present invention is to provide an apparatus and method for providing a service to both a Mobile Station (MS) following a legacy system (or standard system) and an MS following a new system in a broadband wireless communication system using a multi-hop relay scheme.

A further aspect of the present invention is to provide an apparatus and method for providing a service to both an MS of a new system and an MS of a legacy system through a Base Station (BS) of the new system in a broadband wireless communication system using a multi-hop relay scheme.

Yet another aspect of the present invention is to provide an apparatus and method for enabling a BS of a new system to provide a relay service to an MS of a legacy system using a Relay Station (RS) of the legacy system in a broadband wireless communication system using a multi-hop relay scheme.

Still another aspect of the present invention is to provide a frame structure for supporting a different system in a broadband wireless communication system using a multi-hop relay scheme.

Yet another aspect of the present invention is to provide a frame structure for providing a service to both an MS of a new system and an MS of a legacy system through a BS of the new system and simultaneously providing a relay service to the MS of the legacy system using an RS of the legacy system in a broadband wireless communication system using a multi-hop relay scheme.

The above aspects are addressed by providing an apparatus and method for supporting a different system in a broadband wireless communication system using a multi-hop relay scheme.

In accordance with an aspect of the present invention, a method for DownLink (DL) frame communication in a multi-hop relay wireless communication system accepting a different system is provided. The method includes transmitting, by a Base Station (BS), DL data to a legacy Mobile Station (MS) through a legacy access zone within a DL frame, transmitting, by the BS, DL data to a legacy Relay Station (RS) through a legacy relay zone within the DL frame, and transmitting, by the BS, DL data to a new MS through a new zone within the DL frame. The DL frame for the BS may include the legacy access zone for communicating with the legacy MS, the legacy relay zone for communicating with the legacy RS, and the new zone for communicating with the new MS.

In accordance with another aspect of the present invention, a method for UpLink (UL) frame communication in a multi-hop relay wireless communication system accepting a different system is provided. The method includes receiving, by a BS, UL data from a legacy MS through a legacy access zone within a UL frame, receiving, by the BS, UL data from a legacy RS through a legacy relay zone within the UL frame, and receiving, by the BS, UL data from a new MS through a new zone within the UL frame. The UL frame for the BS includes the legacy access zone for communicating with the legacy MS, the legacy relay zone for communicating with the legacy RS, and the new zone for communicating with the new MS.

In accordance with a further aspect of the present invention, a BS apparatus in a multi-hop relay wireless communication system accepting a different system is provided. A DL frame for a BS includes a legacy access zone for communicating with a legacy MS, a legacy relay zone for communicating with a legacy RS, and a new zone for communicating with a new MS. The apparatus includes a first generator, a second generator, a third generator, and a transmitter. The first generator generates DL data to be transmitted through the legacy access zone. The second generator generates DL data to be transmitted through the legacy relay zone. The third generator generates DL data to be transmitted through the new zone. The transmitter transmits the DL data from the first generator to the legacy MS through the legacy access zone, transmits the DL data from the second generator to the legacy RS through the legacy relay zone, and transmits the DL data from the third generator to the new MS through the new zone.

DL/UL frames for the legacy RS each may include three zones, a first zone for communicating with the legacy MS may correspond to the legacy access zone within the DL frame for the BS, a second zone for communicating with the BS by legacy standards may correspond to the legacy relay zone, and a third zone for communicating with the legacy MS may correspond to the new zone.

If an access zone and a new zone are divisions based on a frequency division scheme, a UL frame for the legacy RS may include four zones, a first zone for communicating with the legacy MS may correspond to the legacy access zone within the UL frame for the BS, a second zone for communicating with the BS by legacy standards may correspond to the legacy relay zone, and a third zone and a fourth zone may correspond to the new zone, the third zone being a zone for communicating with the legacy MS and the fourth zone being comprised of an idle zone.

If an access zone and a new zone are divisions based on a frequency division scheme, a UL frame for the legacy RS may include three zones, a first zone for communicating with the legacy MS may correspond to the legacy access zone within the UL frame for the BS, a second zone for communicating with the BS by legacy standards may correspond to the legacy relay zone, and a third zone may correspond to the new zone, the third zone being comprised of an idle zone.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

Figure 1:
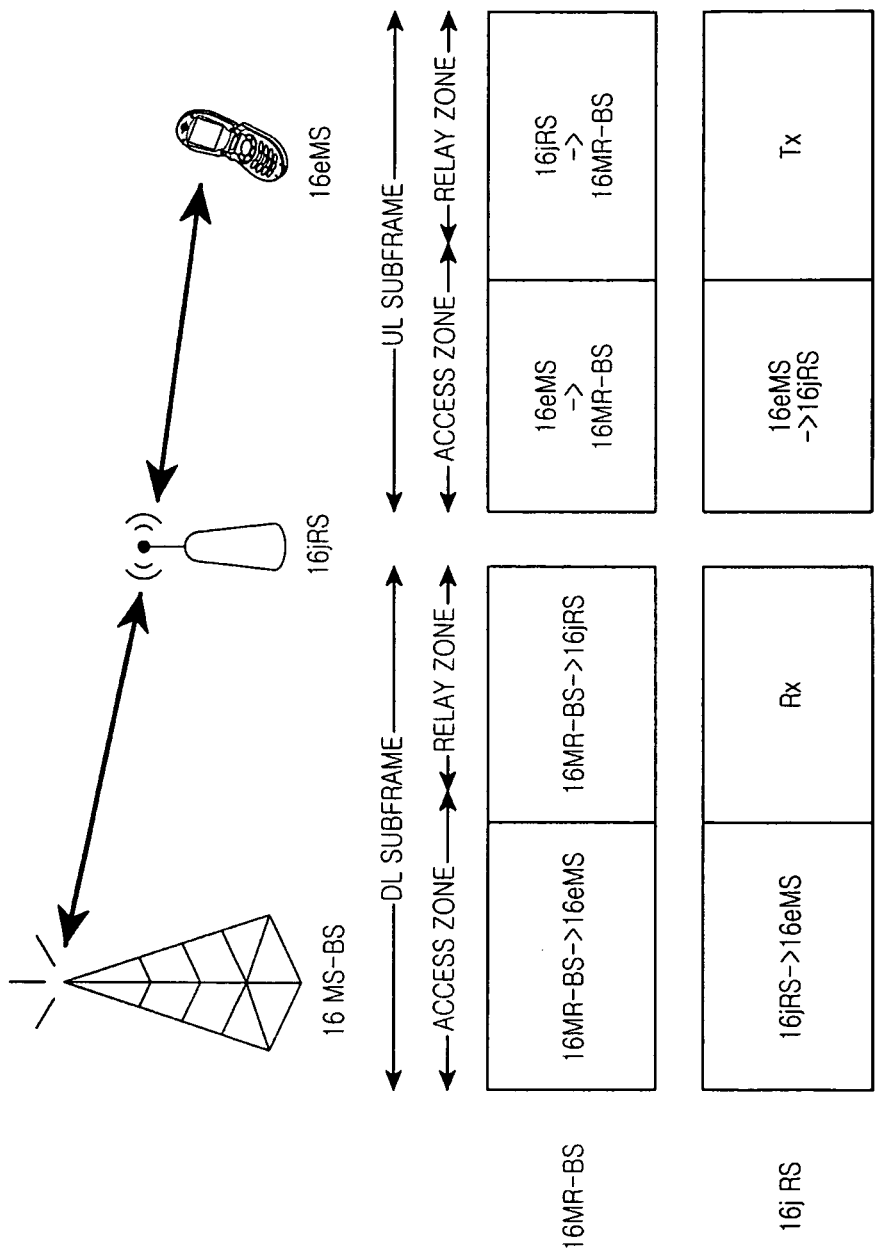
FIG. 1 is a schematic diagram illustrating a construction and frame structure of a conventional Institute of Electrical and Electronics Engineers (IEEE) 802.16j communication system.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A frame structure for supporting different systems in a broadband wireless communication system using a multi-hop relay scheme according to an exemplary embodiment of the present invention is proposed below. In particular, a frame structure for providing a service to both a Mobile Station (MS) of a new system (or standard) and an MS of a legacy system through a Base Station (BS) of the new system and simultaneously, providing a relay service to the MS of the legacy system using a Relay Station (RS) of the legacy system according to an exemplary embodiment of the present invention is proposed below.

The broadband wireless communication system using the multi-hop relay scheme is, for example, a communication system using an Orthogonal Frequency Division Multiplexing (OFDM) scheme or an Orthogonal Frequency Division Multiple Access (OFDMA) scheme. The broadband wireless communication system using the multi-hop relay scheme uses the OFDM/OFDMA scheme and thus, enables high-speed data transmission by transmitting a physical channel signal using a plurality of subcarriers, and can support mobility of an MS through a multi-cell structure.

The following description is, for example, made based on a broadband wireless access communication system. However, it is to be understood that this is merely for the sake of the convenience and that the present invention is not limited to a BWA system. Thus, it should be clearly understood that the present invention is also applicable to any other cellular based communication system using a multi-hop relay scheme.

In the following, for convenience of description, an MS following a legacy system is referred to as a "legacy MS", an MS following a new system is referred to as a "new MS", a BS following a new system is referred to as a "new BS", and an RS following a legacy system is referred to as a "legacy RS". For example, the legacy MS may be an MS following the IEEE 802.16e standard, the new MS may be an MS following the IEEE 802.16m standard, the new BS may be a BS following the IEEE 802.16m standard, and the legacy RS may be an RS following IEEE 802.16j standard.

Figure 2:
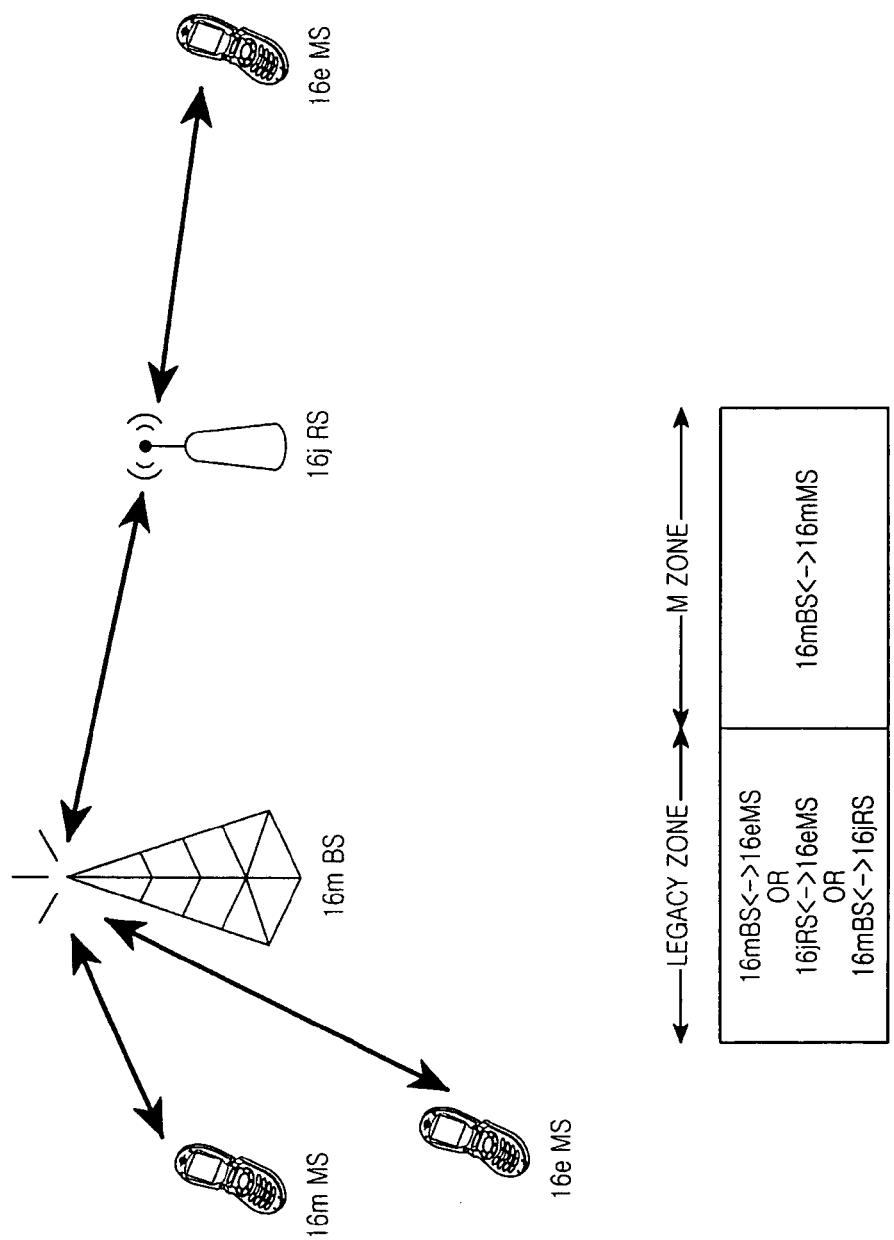
FIG. 2 is a diagram illustrating a Relay Station (RS) of a legacy system introduced to provide a relay service to a Mobile Station (MS) of the legacy system in a new broadband wireless communication system using a multi-hop relay scheme according to an exemplary embodiment of the present invention.

FIG. 2 illustrates a broadband wireless communication system in which entities following different standards according to an exemplary embodiment of the present invention coexist. In particular, FIG. 2 illustrates a legacy RS introduced to provide a relay service to a legacy MS in a new wireless communication system using a multi-hop relay scheme.

As illustrated in FIG. 2, the new broadband wireless communication system may include a new BS (16m BS) and a new MS (16m MS). The new BS (16m BS) may provide a communication service to both the new MS (16m MS) and a legacy MS (16e MS). If the legacy MS (16e MS) is out of a service area of the new BS (16m BS), data of the legacy MS (16e MS) may be forwarded using a relay service of a legacy RS (16j RS). For this, communication between the new BS (16m BS) and the legacy RS (16j RS) should be allowed.

In order to support the aforementioned communication, as illustrated in FIG. 2, a frame may be divided into two zones on the basis of data transmission/reception with an entity belonging to a legacy wireless system. For example, a frame may be divided into a first zone (i.e., a legacy zone) and a second zone (i.e., an M zone). The first zone (i.e., the legacy zone) is for communication between the legacy RS (16j RS) following the legacy wireless system and the legacy MS (16e MS) following the legacy wireless system, communication between the legacy RS (16j RS) following the legacy wireless system and the new BS (16m BS) following the new wireless system, or communication between the new BS (16m BS) following the new wireless system and the legacy MS (16e MS) following the legacy system. The second zone (i.e., the M zone) is for communication between the new BS (16m BS) following the new wireless system and the new MS (16m MS) following the new wireless system.

A frame structure for supporting a wireless communication system of FIG. 2 is described below in more detail.

Figure 3:
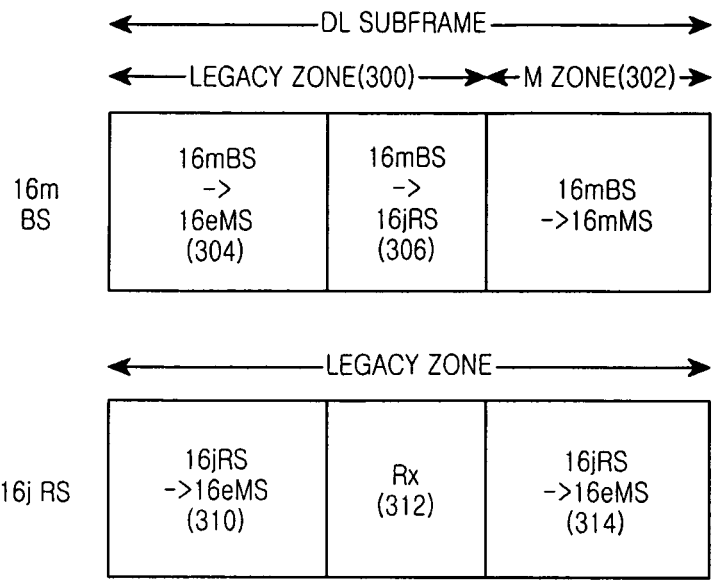
FIG. 3 is a diagram illustrating a DownLink (DL) subframe structure for supporting a service for both an MS of a new system and an MS of a legacy system in a broadband wireless communication system using a multi-hop relay scheme according to an exemplary embodiment of the present invention.

FIG. 3 is a diagram illustrating a DownLink (DL) subframe structure for supporting a service for both a new MS and a legacy MS in a broadband wireless communication system using a multi-hop relay scheme according to an exemplary embodiment of the present invention.

A DL subframe of a new BS (16m BS) is described. The DL subframe is divided into a legacy zone 300 and a new zone (i.e., an M zone) 302. The legacy zone 300 includes a zone for communicating with an entity of a legacy wireless communication system. The new zone (i.e., the M zone) 302 is a zone for communicating with an entity (i.e., an entity using the same standard as a BS) of a new wireless communication system. The legacy zone 300 of the DL subframe may be divided into an access zone 304 and a relay zone 306. The new BS (16m BS) transmits data to a legacy MS (16e MS) through the access zone 304. The new BS (16m BS) transmits DL data necessary to provide a relay service to a legacy MS (16e MS), to a legacy RS (16j RS) through the relay zone 306. The new BS (16m BS) transmits DL data to a new MS (16m MS) following the same wireless communication system as itself, through the new zone 302 of the DL subframe.

An exemplary DL subframe of a legacy RS (16j RS) is described. The DL subframe is comprised of a legacy zone. The legacy zone may be divided into access zones 310 and 314 and a relay zone 312. The legacy RS (16j RS) transmits data to a legacy MS (16e MS) through the access zones 310 and 314. The legacy RS (16j RS) receives DL data transmitted to a legacy MS (16e MS) and data required to provide a relay service to the legacy MS (16e MS), from the new BS (16m BS) through the relay zone 312. As described above, the zone 314, which is substantially identical with the new zone 302 of the DL subframe of the new BS (16m BS), may be used as an access zone for enabling the legacy RS (16j RS) to transmit DL data to the legacy MS (16e MS). The DL subframe of the legacy RS (16j RS) may include a gap for converting transmission/reception of the legacy RS at a time of switching the access zone and relay zone.

Figure 4:
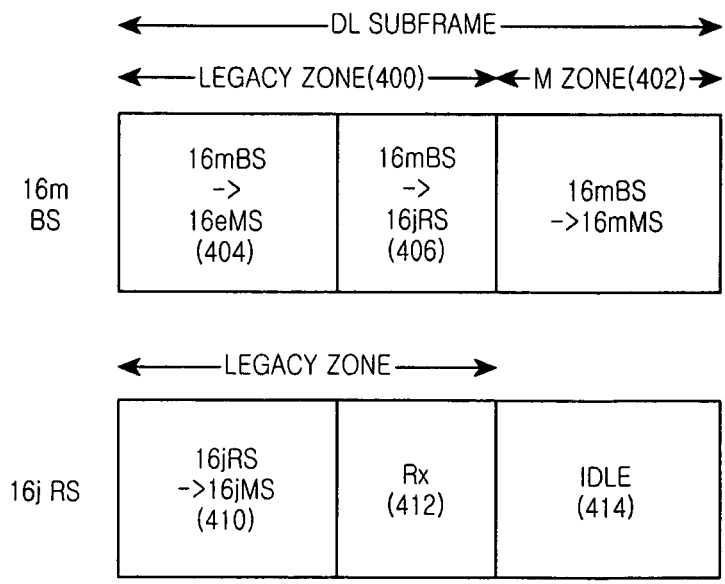
FIG. 4 is a diagram illustrating a DL subframe structure for supporting a service for both an MS of a new system and an MS of a legacy system in a broadband wireless communication system using a multi-hop relay scheme according to an exemplary embodiment of the present invention.

FIG. 4 is a diagram illustrating a DL subframe structure for supporting a service for both a new MS and a legacy MS in a broadband wireless communication system using a multi-hop relay scheme according to an exemplary embodiment of the present invention.

An exemplary DL subframe of a new BS (16m BS) is described. The DL subframe is substantially identical with the DL subframe of the BS (16m BS) described in FIG. 3. That is, legacy zone 400 and new zone (e.g. M zone) 402 are substantially identical with legacy zone 300 and new zone 302, respectively of FIG. 3 including access zone 404 and relay zone 406 being substantially identical to zones 304 and 306.

An exemplary DL subframe of a legacy RS (16j RS) is described. The DL subframe is comprised of a legacy zone as illustrated in FIG. 4. The legacy zone is divided into an access zone 410 and a relay zone 412. The legacy RS (16j RS) transmits data to a legacy MS (16e MS) through the access zone 410. The legacy RS (16j RS) receives DL data transmitted to a legacy MS (16e MS), from the new BS (16m BS) through the relay zone 412. A difference from the DL subframe of FIG. 3 is that a zone of the DL subframe of the legacy RS (16j RS) corresponding to a new zone 402 of the DL subframe of the new BS (16m BS) is comprised of an idle zone 414. That is, the legacy RS (16j RS) does not transmit/receive data during the idle zone. The DL subframe of the legacy RS (16j RS) may include a gap for converting transmission/reception of the legacy RS at a time of switching the access zone and relay zone.

Figure 5:
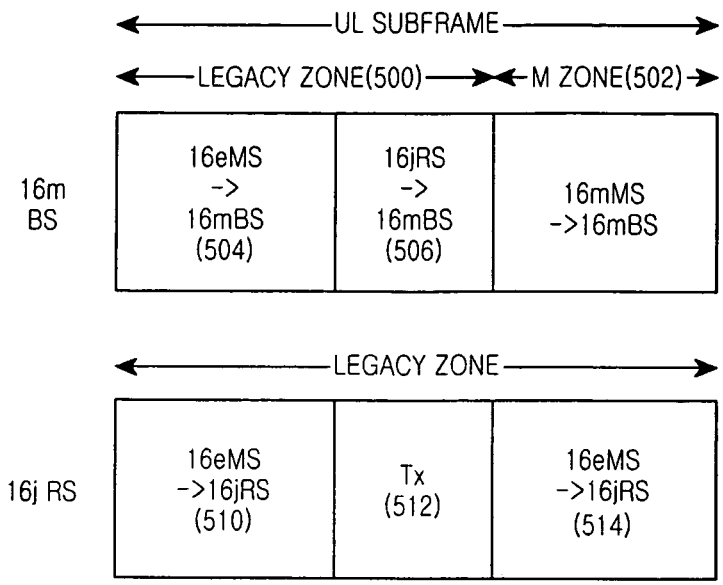
FIG. 5 is a diagram illustrating a UpLink (UL) subframe structure for supporting a service for both an MS of a new system and an MS of a legacy system in a broadband wireless communication system using a multi-hop relay scheme according to an exemplary embodiment of the present invention.

FIG. 5 is a diagram illustrating a UL subframe structure for supporting a service for both a new MS and a legacy MS in a broadband wireless communication system using a multi-hop relay scheme according to an exemplary embodiment of the present invention.

An exemplary UL subframe of a new BS (16m BS) is described. The UL subframe is divided into a legacy zone 500 and a new zone 502. The legacy zone 500 is a zone for communicating with an entity of a legacy wireless communication system. The new zone 502 is a zone for communicating with an entity of the same wireless communication system as that of the new BS (16m BS). The UL legacy zone 500 is divided into an access zone 504 and a relay zone 506. The new BS (16m BS) receives UL data from a legacy MS (16e MS) through the access zone 504. The new BS (16m BS) receives UL data of a legacy MS (16e MS) and UL data necessary to provide a relay service to the legacy MS (16e MS), from the legacy RS (16j RS) through the relay zone 506. The new BS (16m BS) receives UL data from a new MS (16m MS) following the same wireless communication system as itself, through the new zone 502 of the UL subframe.

An exemplary UL subframe of a legacy RS (16j RS) is described. The UL subframe is comprised of a legacy zone. The legacy zone is divided into access zones 510 and 514 and a relay zone 512. The legacy RS (16j RS) receives UL data from a legacy MS (16e MS) through the access zones 510 and 514. The legacy RS (16j RS) transmits UL data from a legacy MS (16e MS) and UL data required to provide a relay service to the legacy MS (16e MS), to the new BS (16m BS) through the relay zone 512. As such, the zone 514, substantially identical with the new zone 502 of the UL subframe of the new BS (16m BS), may be used as an access zone for enabling the legacy RS (16j RS) to receive UL data of the legacy MS (16e MS). The UL subframe of the legacy RS (16j RS) may include a gap for converting transmission/reception of the legacy RS at a time of switching the access zone and relay zone.

Figure 6:
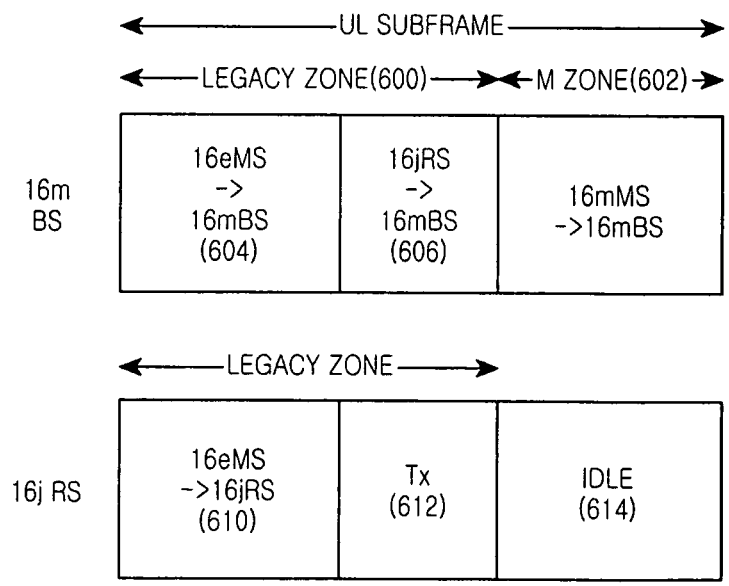
FIG. 6 is a diagram illustrating a UpLink (UL) subframe structure for supporting a service for both an MS of a new system and an MS of a legacy system in a broadband wireless communication system using a multi-hop relay scheme according to an exemplary embodiment of the present invention.

FIG. 6 is a diagram illustrating a UL subframe structure for supporting a service for both a new MS and a legacy MS in a broadband wireless communication system using a multi-hop relay scheme according to an exemplary embodiment of the present invention.

An exemplary UL subframe of a new BS (16m BS) is described. The UL subframe is substantially identical with the UL subframe of the new BS (16m BS) described in FIG. 5. That is, legacy zone 600 and new zone (e.g. M zone) 602 are substantially identical with legacy zone 500 and new zone 502, respectively of FIG. 5 including access zone 604 and relay zone 606 being substantially identical to zones 504 and 506, respectively.

An exemplary UL subframe of a legacy RS (16j RS) is described. The UL subframe is comprised of a legacy zone as in FIG. 5. The legacy zone is divided into an access zone 610 and a relay zone 612. The legacy RS (16j RS) receives UL data from a legacy MS (16e MS) through the access zone 610. The legacy RS (16j RS) transmits the UL data from the legacy MS (16e MS), to the new BS (16m BS) through the relay zone 612. A difference from FIG. 5 is that a zone of the UL subframe of the legacy RS (16j RS) corresponding to the new zone 602 of the UL subframe of the new BS (16m BS) is comprised of an idle zone 614. That is, the legacy RS (16j RS) does not transmit/receive data during the idle zone. The UL subframe of the legacy RS (16j RS) may include a gap for converting transmission/reception of the legacy RS at a time of switching the access zone and relay zone.

The aforementioned UL subframe of FIG. 5 or 6 is comprised of a legacy zone, a new zone, an access zone, and a relay zone by dividing a time domain resource. A description of dividing a zone by dividing a frequency domain resource according to another exemplary embodiment of the present invention is made below.

Figure 7:
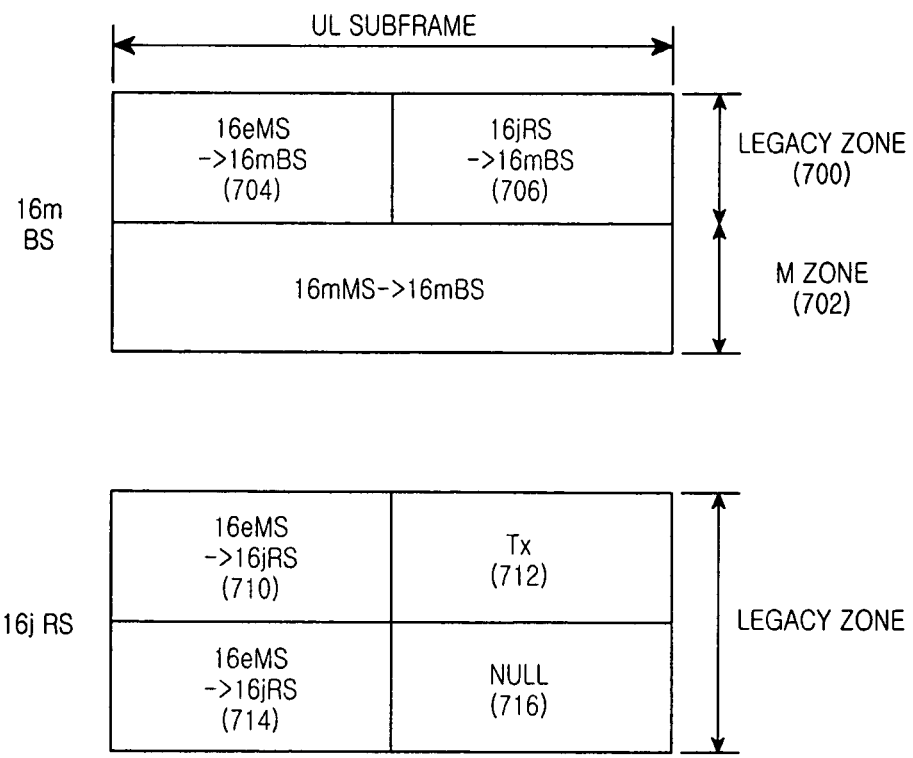
FIG. 7 is a diagram illustrating a UL subframe structure for supporting a service for both an MS of a new system and an MS of a legacy system in a broadband wireless communication system using a multi-hop relay scheme according to an exemplary embodiment of the present invention.

FIG. 7 is a diagram illustrating a UL subframe structure for supporting a service for both a new MS and a legacy MS in a broadband wireless communication system using a multi-hop relay scheme according to an exemplary embodiment of the present invention.

An exemplary UL subframe of a new BS (16m BS) is described. The UL subframe is divided into a legacy zone 700 and a new zone (i.e., an M zone) 702. The legacy zone 700 includes a zone for communicating with an entity of a legacy wireless communication system. The new zone 702 includes a zone for communicating with an entity of the same wireless communication system as that of the new BS (16m BS). The legacy zone 700 and the new zone 702 are constructed to divide a frequency domain resource. The dividing of the frequency domain resource may include allocating a portion of subcarriers to a legacy zone or new zone, allocating a group of subcarriers to a legacy zone or new zone, or allocating a portion of a subcarrier to an MS following a new wireless communication system and allocating a portion thereof to an MS following a legacy wireless communication system.

The UL legacy zone 700 is divided into an access zone 704 and a relay zone 706. The access zone 704 and relay zone 706 can be constructed to divide a time domain resource. The new BS (16m BS) receives UL data from a legacy MS (16e MS) through the access zone 704. The new BS (16m BS) receives UL data of a legacy MS (16e MS) and UL data necessary to provide a relay service to the legacy MS (16e MS), from a legacy RS (16j RS) through the relay zone 706. The new BS (16m BS) receives UL data from a new MS (16m MS) following the same wireless communication system as itself through the new zone 702 of the UL subframe.

An exemplary UL subframe of a legacy RS (16j RS) is described. The UL subframe is comprised of a legacy zone. The legacy zone is divided into access zones 710 and 714 and a relay zone 712. The access zone 710 and the relay zone 712 can be constructed to divide a time domain resource. The legacy RS (16j RS) receives data from a legacy MS (16e MS) through the access zones 710 and 714. The legacy RS (16j RS) transmits UL data from a legacy MS (16e MS) and UL data required to provide a relay service to the legacy MS (16e MS), to the new BS (16m BS) through the relay zone 712.

As such, the zone 714 corresponding to the new zone 702 of the UL subframe of the new BS (16m BS) may be used as an access zone for enabling the legacy RS (16j RS) to receive UL data of the legacy MS (16e MS). However, if the new zone 702 of the UL subframe of the new BS (16m BS) and the zone 712 for enabling the legacy RS (16j RS) to transmit UL data to the new BS (16m BS) use the same time domain, a corresponding same resource domain cannot be used as an access zone for enabling the legacy RS (16j RS) to receive UL data from the legacy MS (16e MS). That is, the same resource domain may be comprised of a null zone 716. The UL subframe of the legacy RS (16j RS) may include a gap for converting transmission/reception of the legacy RS at a time of switching the access zone and relay zone.

Figure 8:
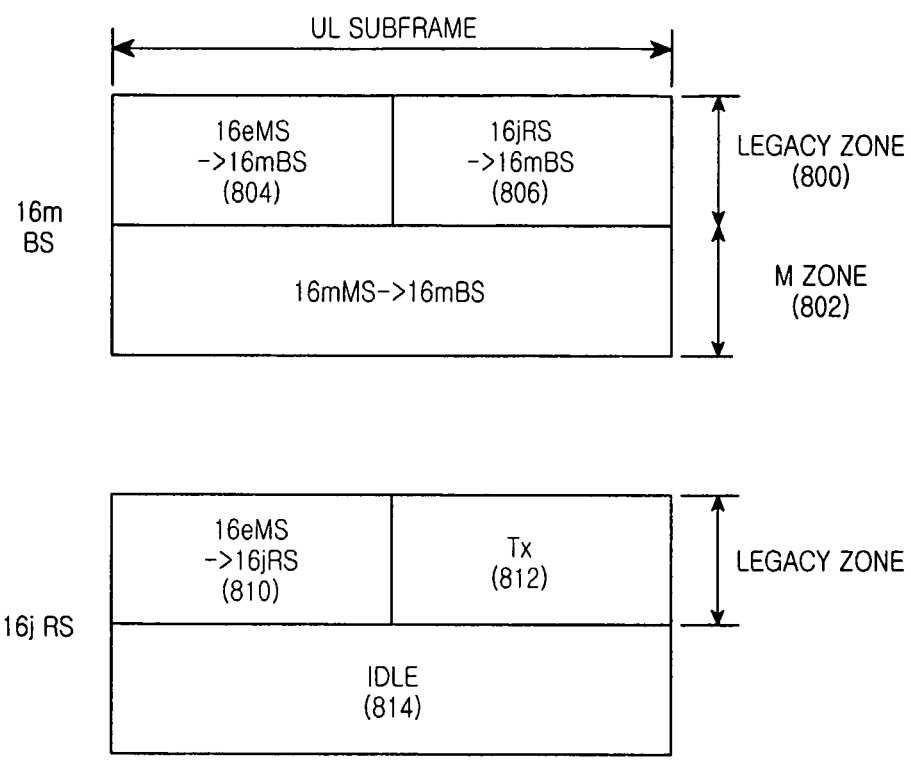
FIG. 8 is a diagram illustrating a UL subframe structure for supporting a service for both an MS of a new system and an MS of a legacy system in a broadband wireless communication system using a multi-hop relay scheme according to an exemplary embodiment of the present invention.

FIG. 8 is a diagram illustrating a UL subframe structure for supporting a service for both a new MS and a legacy MS in a broadband wireless communication system using a multi-hop relay scheme according to an exemplary embodiment of the present invention.

A UL subframe of a new BS (16m BS) is described. The UL subframe is substantially identical with the UL subframe of the BS (16m BS) described in FIG. 7. That is, legacy zone 800 and new zone (e.g. M zone) 802 are substantially identical with legacy zone 700 and new zone 702, respectively of FIG. 7 including access zone 804 and relay zone 806 being substantially identical to zones 704 and 706, respectively.

An exemplary UL subframe of a legacy RS (16j RS) is described. The UL subframe is comprised of a legacy zone as in FIG. 7. The legacy zone is divided and constructed by an access zone 810 and a relay zone 812. The access zone 810 and the relay zone 812 can be constructed to divide a time domain resource. The legacy RS (16j RS) receives UL data from a legacy MS (16e MS) through the access zone 810. The legacy RS (16j RS) transmits UL data from a legacy MS (16e MS), to the new BS (16m BS) through the relay zone 812.

A difference from FIG. 7 is that a zone 814 of the UL subframe of the legacy RS (16j RS) corresponding to a new zone 802 of the UL subframe of the new BS (16m BS) is comprised of an idle zone. That is, the legacy RS (16j RS) does not transmit/receive data during the idle zone 814. The UL subframe of the legacy RS (16j RS) may include a gap for converting transmission/reception of the RS at a time of switching the access zone 810 and relay zone 812.

As described above, an exemplary embodiment of the present invention provides structures of DL and UL subframes of a BS and UL and DL subframes of an RS that can be used in a wireless communication system in which a new BS and new MS following a new system and a legacy RS and legacy MS following a legacy system coexist. The UL subframe structures and DL subframe structures described in FIGS. 3 to 8 each can be combined in various forms and constitute a frame for a system. The assumption is that the combination includes all possible cases.

An operation of an exemplary embodiment of the present invention based on the aforementioned frame structure is described below.

Figure 9:
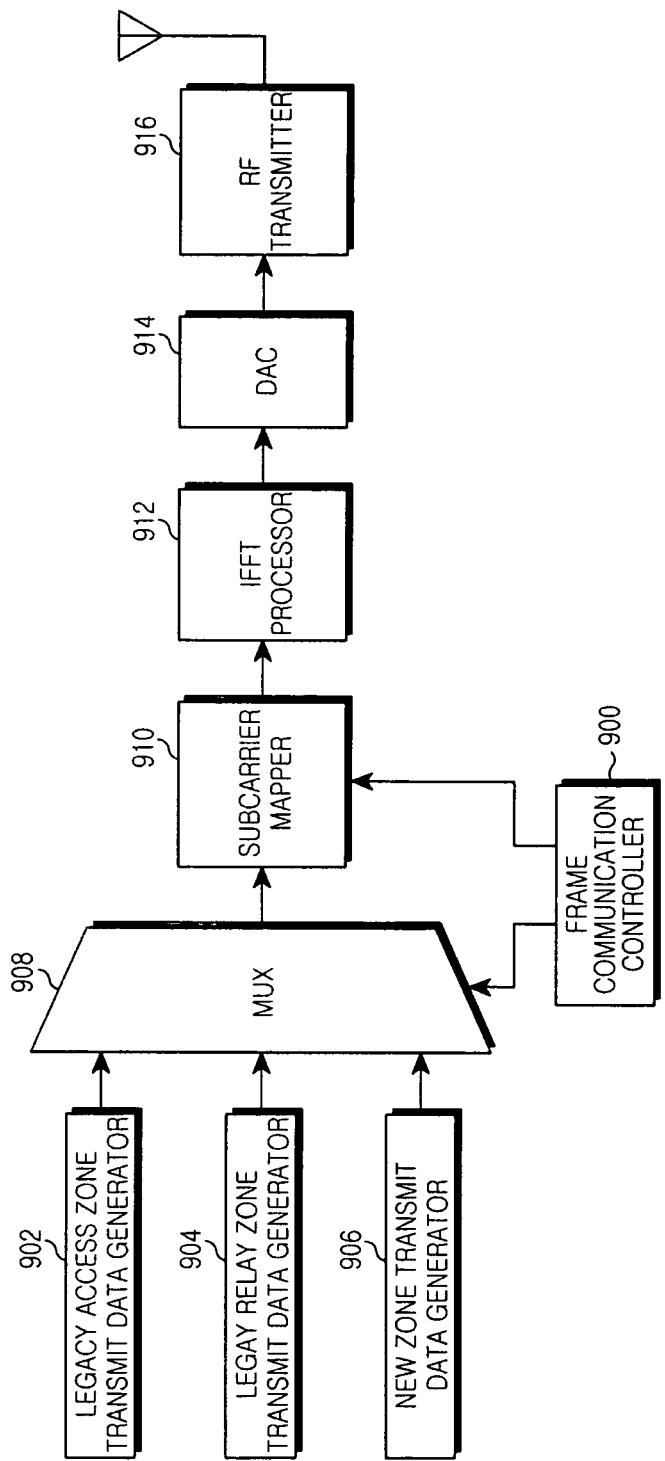
FIG. 9 is a block diagram illustrating a construction of a DL communicator of a new BS in a multi-hop relay wireless communication system accepting a different system according to an exemplary embodiment of the present invention.

FIG. 9 is a block diagram illustrating a construction of a DL communicator of a new BS in a multi-hop relay wireless communication system accepting a different system according to an exemplary embodiment of the present invention.

As illustrated in FIG. 9, the DL communicator includes a frame communication controller 900, a legacy access zone transmit data generator 902, a legacy relay zone transmit data generator 904, a new zone transmit data generator 906, a multiplexer 908, a subcarrier mapper 910, an Inverse Fast Fourier Transform (IFFT) processor 912, a Digital to Analog Converter (DAC) 914, and a Radio Frequency (RF) transmitter 916.

Referring to FIG. 9, the legacy access zone transmit data generator 902 generates data to be transmitted through a legacy access zone. That is, the legacy access zone transmit data generator 902 generates DL data to be transmitted to a legacy MS. The legacy relay zone transmit data generator 904 generates data to be transmitted through a legacy relay zone. That is, the legacy relay zone transmit data generator 904 generates DL data to be transmitted to a legacy RS. The new zone transmit data generator 906 generates data to be transmitted through a new zone. That is, the new zone transmit data generator 906 generates DL data to be transmitted to a new MS. In an exemplary implementation, the generators 902 to 906 each include a processor (e.g., a Media Access Control (MAC) processor) for processing signaling of a corresponding standard, an encoder and modulator for encoding and modulating a transmission packet, etc.

The frame communication controller 900 controls the multiplexer 908 and the subcarrier mapper 910 to perform DL communication depending on a determined DL subframe structure.

Under control of the controller 900, the multiplexer 908 selects an output of the generators 902 to 906 and provides the selected output to the subcarrier mapper 910. For a legacy access zone of a DL subframe, the multiplexer 908 selects transmit data from the generator 902 and provides the selected transmit data to the subcarrier mapper 910. For a legacy relay zone, the multiplexer 908 selects transmit data from the generator 904 and provides the selected transmit data to the subcarrier mapper 910. For a new zone, the multiplexer 908 selects transmit data from the generator 906 and provides the selected transmit data to the subcarrier mapper 910. In an exemplary implementation, the legacy access zone, the legacy relay zone, and the new zone are divisions based on a time division scheme as in FIGS. 3 and 4.

Under control of the controller 900, the subcarrier mapper 910 permutates the transmit data from the multiplexer 908 according to a permutation scheme (or a subchannel allocation scheme) of a corresponding standard or zone, and subcarrier-maps the permutated data.

The IFFT processor 912 IFFT-processes the subcarrier-mapped data from the subcarrier mapper 910 and outputs sample data. At this time, the IFFT processor 912 inserts a guard interval (e.g., a Cyclic Prefix (CP)) into the sample data and generates an OFDM symbol. The DAC 914 converts the sample data from the IFFT processor 912 into an analog signal. The RF transmitter 916 converts a baseband signal from the DAC 914 into an RF band signal and transmits the RF band signal through an antenna.

Figure 10:
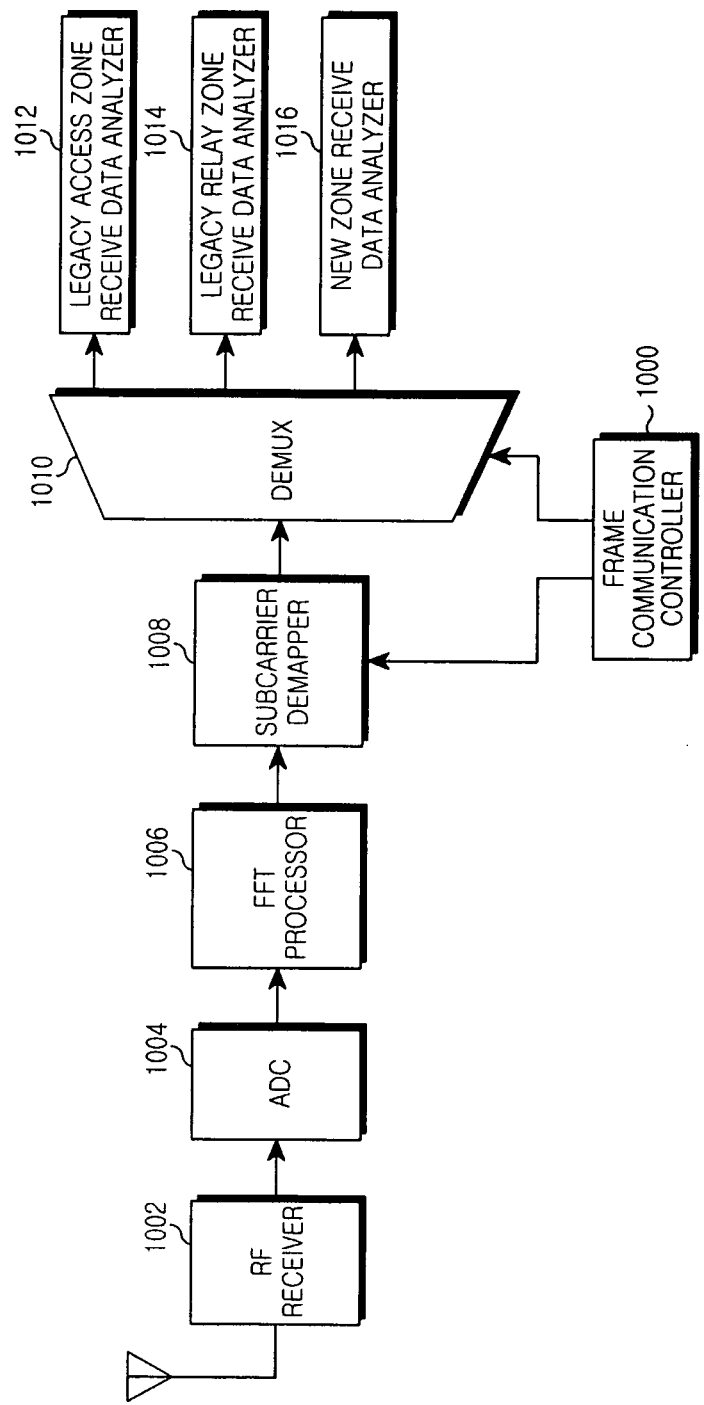
FIG. 10 is a block diagram illustrating a construction of a UL communicator of a new BS in a multi-hop relay wireless communication system accepting a different system according to an exemplary embodiment of the present invention.

FIG. 10 is a block diagram illustrating a construction of a UL communicator of a new BS in a multi-hop relay wireless communication system accepting a different system according to an exemplary embodiment of the present invention.

As illustrated in FIG. 10, the UL communicator includes a frame communication controller 1000, an RF receiver 1002, an Analog to Digital Converter (ADC) 1004, a Fast Fourier Transform (FFT) processor 1006, a subcarrier demapper 1008, a demultiplexer 1010, a legacy access zone receive data analyzer 1012, a legacy relay zone receive data analyzer 1014, and a new zone receive data analyzer 1016.

Referring to FIG. 10, the RF receiver 1002 converts an RF band signal received through an antenna into a baseband signal. The ADC 1004 converts the baseband analog signal from the RF receiver 1002 into digital sample data. The FFT processor 1006 eliminates a guard interval (e.g., a CP) from the sample data from the ADC 1004 and FFT-processes the sample data from which the guard interval is eliminated.

The frame communication controller 1000 controls the subcarrier demapper 1008 and the demultiplexer 1010 to perform UL communication depending on a determined UL subframe structure. divides the data from the FFT processor 1006 by zone, and rearranges data of each zone according to a permutation scheme of a corresponding zone. The zone can be divided in a time division scheme as in FIGS. 5 and 6 or can be divided in a frequency division scheme as in FIGS. 7 and 8.

Under control of the controller 1000, the demultiplexer 1010 selects legacy access zone receive data among the data from the subcarrier demapper 1008, provides the selected legacy access zone receive data to the analyzer 1012, selects and provides legacy relay zone receive data to the analyzer 1014, and selects and provides new zone receive data to the analyzer 1016.

The analyzer 1012 demodulates and decodes the legacy access zone receive data from the demultiplexer 1010, and analyzes the decoded data. That is, the analyzer 1012 analyzes UL data received from a legacy MS. The analyzer 1014 demodulates and decodes the legacy relay zone receive data from the demultiplexer 1010 and analyzes the decoded data. That is, the analyzer 1014 analyzes UL data received from a legacy RS. The analyzer 1016 demodulates and decodes the new zone receive data from the demultiplexer 1010 and analyzes the decoded data. That is, the analyzer 1016 analyzes UL data received from a new MS. In an exemplary implementation, the analyzers 1012 to 1016 each include a processor (e.g., a MAC processor) for processing signaling of a corresponding standard, a demodulator and decoder for restoring a reception packet, etc.

Figure 11:
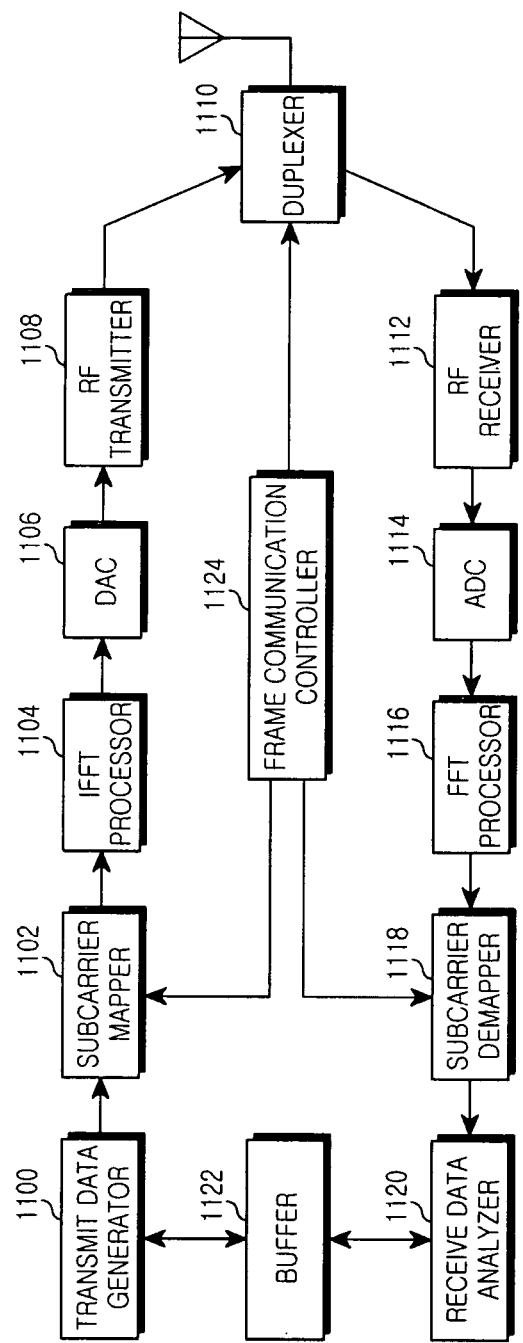
FIG. 11 is a block diagram illustrating a construction of an RS in a multi-hop relay wireless communication system accepting a different system according to an exemplary embodiment of the present invention.

FIG. 11 is a block diagram illustrating a construction of an RS in a multi-hop relay wireless communication system accepting a different system according to an exemplary embodiment of the present invention.

As illustrated in FIG. 11, the RS includes a transmit data generator 1100, a subcarrier mapper 1102, an IFFT processor 1104, a DAC 1106, an RF transmitter 1108, a duplexer 1110, an RF receiver 1112, an ADC 1114, an FFT processor 1116, a subcarrier demapper 1118, a receive data analyzer 1120, a buffer 1122, and a frame communication controller 1124.

Referring to FIG. 11, the buffer 1122 temporarily buffers relay-transmitted UL data and DL data. For example, the buffer 1122 can temporarily buffer DL data from a new BS before transmitting the DL data to a legacy MS, and can temporarily buffer UL data from the legacy MS before transmitting the UL data to the new BS.

The transmit data generator 1100 generates data to be transmitted to a legacy MS or new BS using the data from the buffer 1122. The assumption is that the transmit data generator 1100 includes a processor for processing signaling of a legacy standard, an encoder and modulator for encoding and modulating a transmission packet, etc.

The frame communication controller 1124 controls the subcarrier mapper 1102, the subcarrier demapper 1118, and the duplexer 1110 to perform DL and UL communication depending on a determined frame structure.

Under control of the controller 1124, the subcarrier mapper 1102 permutates transmit data from the transmit data generator 1100 according to a permutation scheme (or a subchannel allocation scheme) of a corresponding standard and subcarrier-maps the permutated data. At this time, the subcarrier mapper 1102 may use a group (or bunch) of frequencies in the frequency domain or may use a portion of frequency domains depending on a determined frame structure. For example, in DL communication, the subcarrier mapper 1102 may use a group of subcarriers in the frequency domain such as relay zones of FIGS. 3 and 4. In UL communication, the subcarrier mapper 1102 may use a group of subcarriers in the frequency domain such as relay zones of FIGS. 5 and 6 or use a portion of subcarriers in the frequency domain such as relay zones of FIGS. 7 and 8.

The IFFT processor 1104 IFFT-processes the subcarrier-mapped data from the subcarrier mapper 1102 and outputs sample data. At this time, the IFFT processor 1104 inserts a guard interval (e.g., a CP) into the sample data and generates an OFDM symbol. The DAC 1106 converts the sample data from the IFFT processor 1104 into an analog signal. The RF transmitter 1108 converts a baseband signal from the DAC 1106 into an RF band signal and provides the RF band signal to the duplexer 1110.

The duplexer 1110 transmits the transmit signal from the RF transmitter 1108 through an antenna and provides a signal received through the antenna to the RF receiver 1112. At this time, the duplexer 1110 performs transmission/reception conversion under control of the controller 1124.

The RF receiver 1112 converts the RF band signal from the duplexer 1110 into a baseband signal. The ADC 1114 converts the baseband analog signal from the RF receiver 1112 into digital sample data. The FFT processor 1116 eliminates a guard interval from the sample data from the ADC 1114 and FFT-processes the sample data from which the guard interval is eliminated.

Under control of the controller 1124, the subcarrier demapper 1118 rearranges data from the FFT processor 1116 according to a permutation scheme of a corresponding standard, and extracts receive data intended for decoding. At this time, according to a frame structure, the subcarrier demapper 1118 may use a group of subcarriers in the frequency domain or use a portion of subcarriers in the frequency domain. For example, in DL communication, the subcarrier demapper 1118 may use a group of subcarriers in the frequency domain such as access zones of FIGS. 5 and 6 or use a portion of frequency domain such as access zones of FIGS. 7 and 8.

The receive data analyzer 1120 restores receive data from the subcarrier demapper 1118, and stores the restored data in the buffer 1122 for relay transmission. In an exemplary implementation, the receive data analyzer 1120 includes a processor for processing signaling of a legacy standard, a demodulator and decoder for restoring a reception packet, etc.

Figure 12:
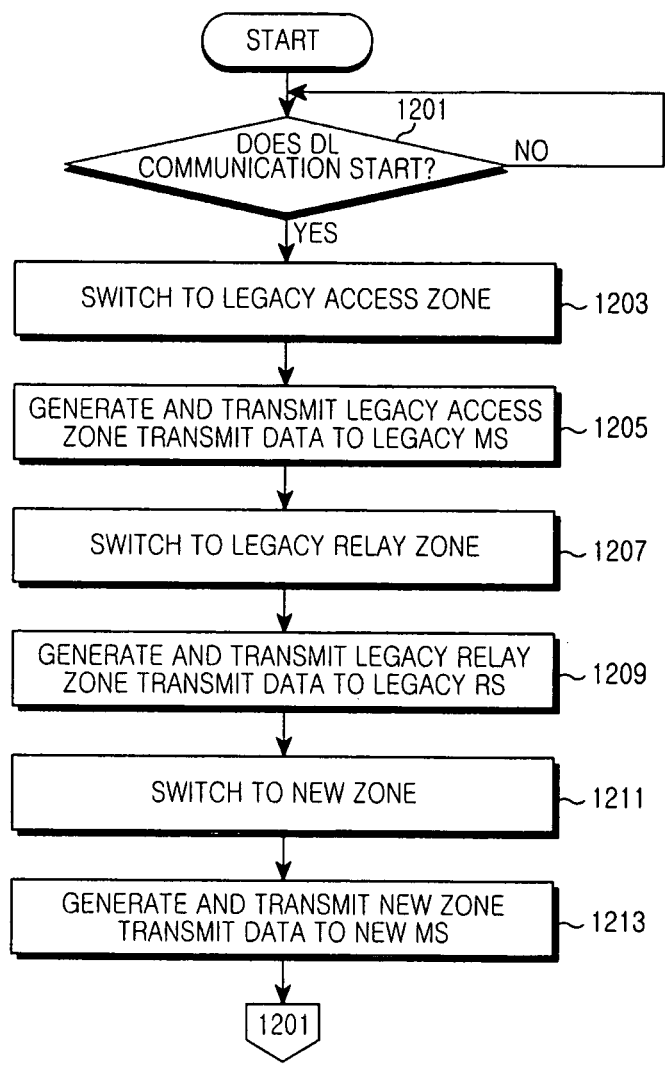
FIG. 12 is a flowchart illustrating a DL communication process of a new BS in a multi-hop relay wireless communication system accepting a different system according to an exemplary embodiment of the present invention.

FIG. 12 is a flowchart illustrating a DL communication process of a new BS in a multi-hop relay wireless communication system accepting a different system according to an exemplary embodiment of the present invention. A description of an operation of FIG. 12 is made below on the assumption that a legacy access zone, a legacy relay zone, and a new zone are divided based on a time division scheme as in FIGS. 3 and 4.

Referring to FIG. 12, in step 1201, the new BS identifies if DL communication starts. If the DL communication starts, in step 1203, the new BS performs zone switching to a legacy access zone. That is, the new BS performs a preparation (i.e., transmission/reception conversion, permutation setting, etc.) for legacy access zone DL communication. After switching to the legacy access zone, in step 1205, the new BS generates legacy access zone transmit data, maps the generated transmit data to the legacy access zone, and transmits the mapped transmit data to a legacy MS.

In step 1207, the new BS performs switching to a legacy relay zone. That is, the new BS performs a preparation for legacy relay zone DL communication. After switching to the legacy relay zone, in step 1209, the new BS generates legacy relay zone transmit data, maps the generated transmit data to the legacy relay zone, and transmits the mapped transmit data to a legacy RS.

In step 1211, the BS performs zone switching to a new zone. After performing a preparation for new zone DL communication as above, in step 1213, the new BS generates new zone transmit data, maps the generated transmit data to the new zone, and transmits the mapped transmit data to a new MS. Then, if the new zone communication is completed, the new BS returns to step 1201 to identify a next DL communication start.

Figure 13:
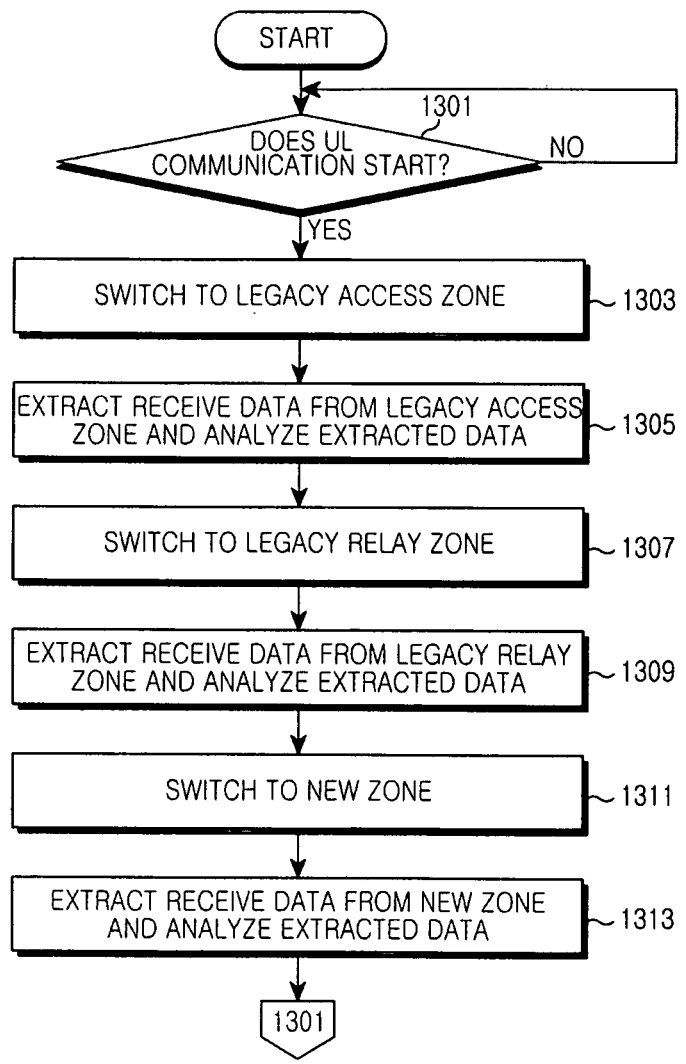
FIG. 13 is a flowchart illustrating a UL communication process of a new BS in a multi-hop relay wireless communication system accepting a different system according to an exemplary embodiment of the present invention.

FIG. 13 is a flowchart illustrating a UL communication process of a new BS in a multi-hop relay wireless communication system accepting a different system according to an exemplary embodiment of the present invention. A description of an operation of FIG. 13 is made below on the assumption that a legacy access zone, a legacy relay zone, and a new zone are divisions based on a time division scheme as in FIGS. 5 and 6.

Referring to FIG. 13, in step 1301, the new BS identifies if UL communication starts. If the UL communication starts, in step 1303, the new BS performs switching to a legacy access zone. That is, the new BS performs a preparation (i.e., transmission/reception conversion, permutation setting, etc.) for legacy access zone UL communication. After switching to the legacy access zone, in step 1305, the new BS extracts receive data from a legacy MS from the legacy access zone, and analyzes the extracted receive data through demodulation and decoding.

In step 1307, the new BS performs switching to a legacy relay zone. That is, the new BS performs a preparation for legacy relay zone UL communication. After switching to the legacy relay zone, in step 1309, the new BS extracts receive data from a legacy RS from the legacy relay zone, and analyzes the extracted receive data through demodulation and decoding.

In step 1311, the BS performs zone switching to a new zone. After performing a preparation for new zone UL communication as above, in step 1313, the new BS extracts receive data from a new MS from the new zone, and analyzes the extracted receive data through demodulation and decoding. Then, if the new zone communication is completed, the new BS returns to step 1301 to identify a next UL communication start.

Figure 14:
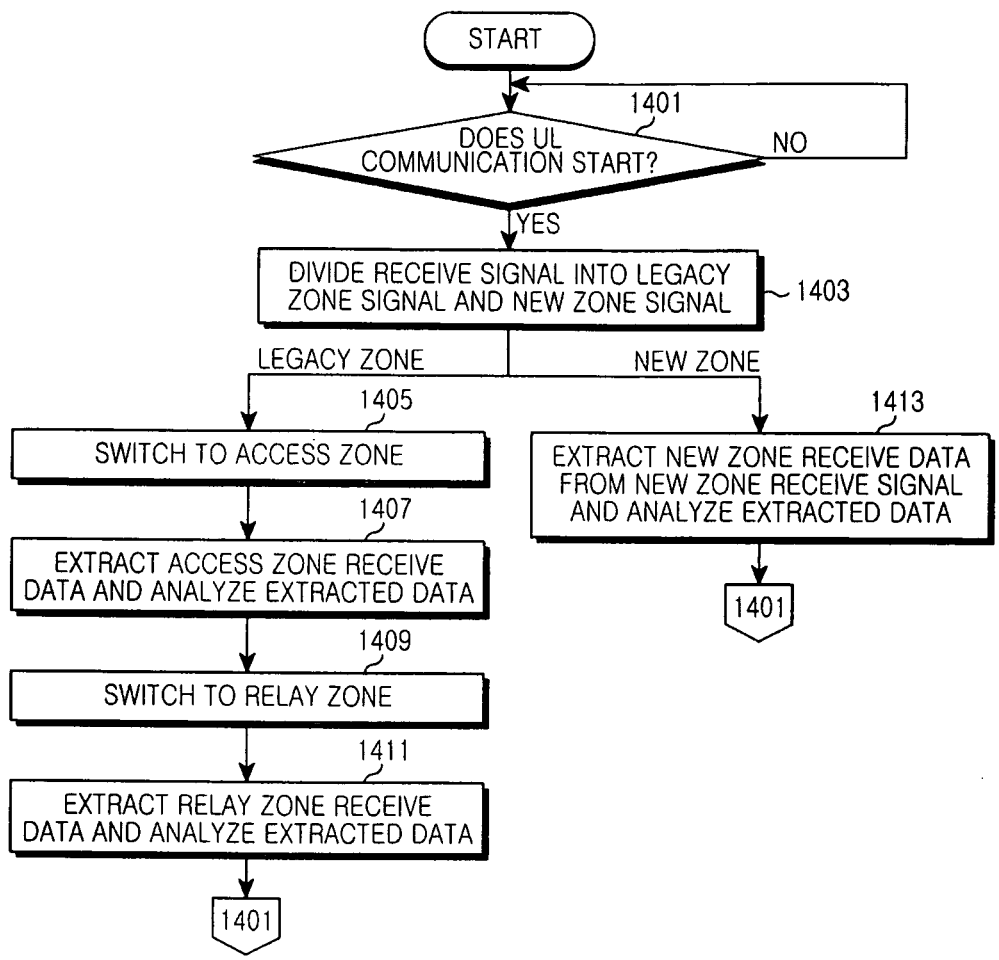
FIG. 14 is a flowchart illustrating a UL communication process of a new BS in a multi-hop relay wireless communication system accepting a different system according to another exemplary embodiment of the present invention.

FIG. 14 is a flowchart illustrating a UL communication process of a new BS in a multi-hop relay wireless communication system accepting a different system according to an exemplary embodiment of the present invention. A description of an operation of FIG. 14 is made below on the assumption that a legacy zone and a new zone are divisions based on a frequency division scheme as in FIGS. 7 and 8.

Referring to FIG. 14, in step 1401, the new BS identifies if UL communication starts. If the UL communication starts, in step 1403, the new BS divides a receive signal into a legacy zone signal and a new zone signal according to a frequency division scheme. Then, the new BS processes the divided legacy zone signal and new zone signal, respectively.

A legacy zone signal process is described. In step 1405, the new BS switches to an access zone. That is, the new BS performs a preparation (i.e., transmission/reception conversion, permutation setting, etc.) for legacy access zone UL communication. After switching to the legacy access zone, in step 1407, the new BS extracts access zone receive data (i.e., receive data from a legacy MS) from the divided legacy zone signal and analyzes the extracted receive data through demodulation and decoding.

Then, if the legacy access zone communication is completed, in step 1409, the new BS performs switching to a legacy relay zone. That is, the new BS performs a preparation for legacy relay zone UL communication. After switching to the legacy relay zone, in step 1411, the new BS extracts relay zone receive data (i.e., receive data from a legacy RS) from the divided legacy zone signal and analyzes the extracted receive data through demodulation and decoding. Then, if the legacy access zone communication is completed, the new BS returns to step 1401 to determine a next UL communication start.

A new zone signal process is described. In step 1413, the new BS extracts receive data from a new MS from the divided new zone signal and analyzes the extracted receive data through demodulation and decoding. Then, if the new zone communication is completed, the new BS returns to step 1401 to determine a next UL communication start.

Figure 15:
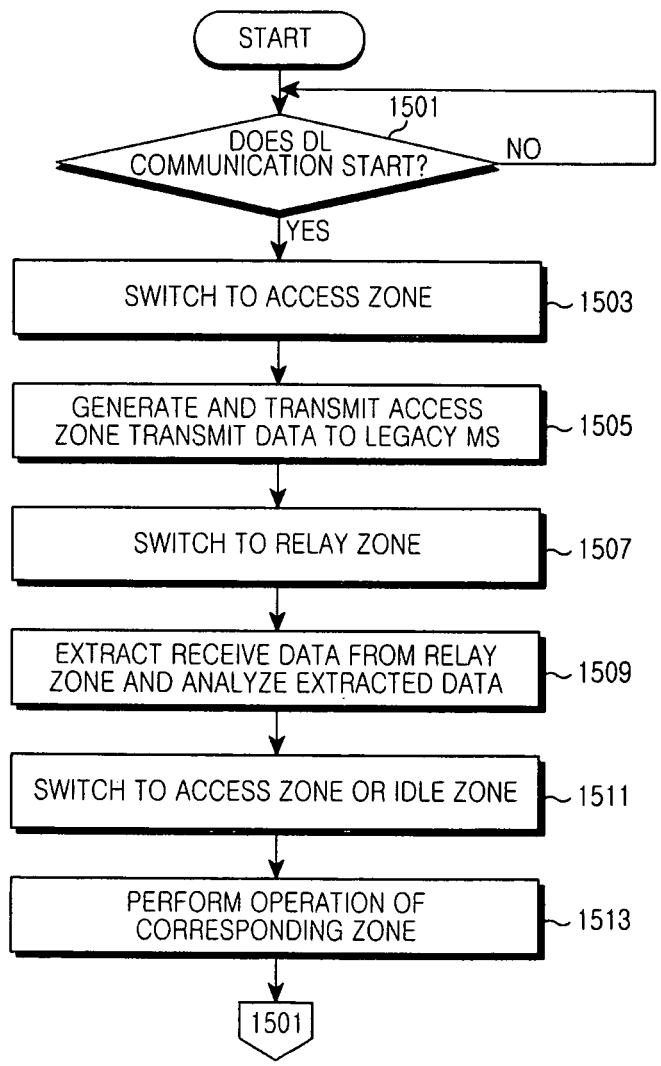
FIG. 15 is a flowchart illustrating a DL communication process of a legacy RS in a multi-hop relay wireless communication system accepting a different system according to an exemplary embodiment of the present invention.

FIG. 15 is a flowchart illustrating a DL communication process of a legacy RS in a multi-hop relay wireless communication system accepting a different system according to an exemplary embodiment of the present invention. A description of an operation of FIG. 15 is made below on the assumption that an access zone and a relay zone are divisions based on a time division scheme as in FIGS. 3 and 4.

Referring to FIG. 15, in step 1501, the legacy RS determines if DL communication starts. If the DL communication starts, in step 1503, the legacy RS switches to an access zone. That is, the legacy RS performs a preparation (i.e., transmission/reception conversion, permutation setting, etc.) for access zone DL communication. After switching to the access zone, in step 1505, the legacy RS generates access zone transmit data, maps the generated transmit data to the access zone, and relay-transmits the mapped transmit data to a legacy MS.

Then, if the access zone communication is completed, in step 1507, the legacy RS performs switching to a relay zone. That is, the legacy RS performs a preparation for relay zone DL communication. After switching to the relay zone, in step 1509, the legacy RS extracts receive data from a new BS from the relay zone signal and analyzes the extracted receive data through demodulation and decoding.

Then, if the relay zone communication is completed, in step 1511, the legacy RS performs switching to an access zone (FIG. 3) or an idle zone (FIG. 4) according to a frame structure. In step 1513, the legacy RS performs an operation of the access zone or the idle zone and then, returns to step 1501 to determine if a next DL communication starts.

Figure 16:
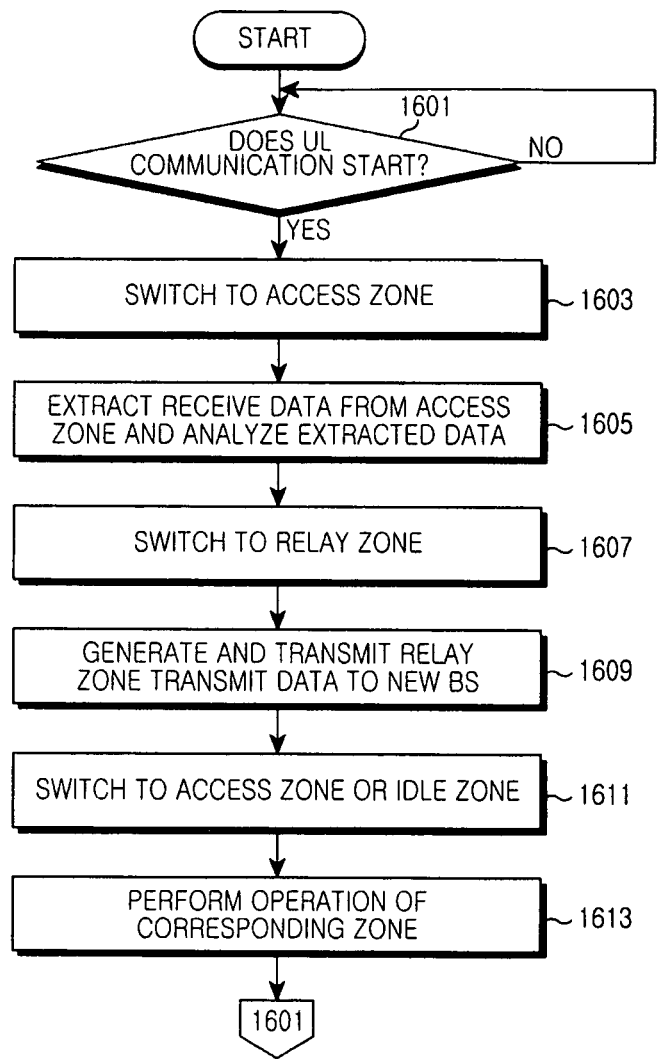
FIG. 16 is a flowchart illustrating a UL communication process of a legacy RS in a multi-hop relay wireless communication system accepting a different system according to an exemplary embodiment of the present invention.

FIG. 16 is a flowchart illustrating a UL communication process of a legacy RS in a multi-hop relay wireless communication system accepting a different system according to an exemplary embodiment of the present invention. A description of an operation of FIG. 16 is made below on the assumption that an access zone and a relay zone are divisions based on a time division scheme as in FIGS. 5 and 6.

Referring to FIG. 16, in step 1601, the legacy RS determines if UL communication starts. If the UL communication starts, in step 1603, the legacy RS switches to an access zone. That is, the legacy RS performs a preparation (i.e., transmission/reception conversion, permutation setting, etc.) for access zone UL communication. After switching to the access zone, in step 1605, the legacy RS extracts receive data from a legacy MS from the access zone and analyzes the extracted receive data through demodulation and decoding.

Then, if the access zone communication is completed, in step 1607, the legacy RS performs switching to a relay zone. That is, the legacy RS performs a preparation for relay zone UL communication. After switching to the relay zone, in step 1609, the legacy RS generates relay zone transmit data, maps the generated transmit data to the relay zone, and transmits the mapped transmit data to a new BS.

Then, if the relay zone communication is completed, in step 1611, the legacy RS performs switching to an access zone (FIG. 3) or an idle zone (FIG. 4) according to a frame structure. In step 1613, the legacy RS performs an operation of the access zone or the idle zone and then, returns to step 1601 to determine if a next UL communication starts.

Figure 17:
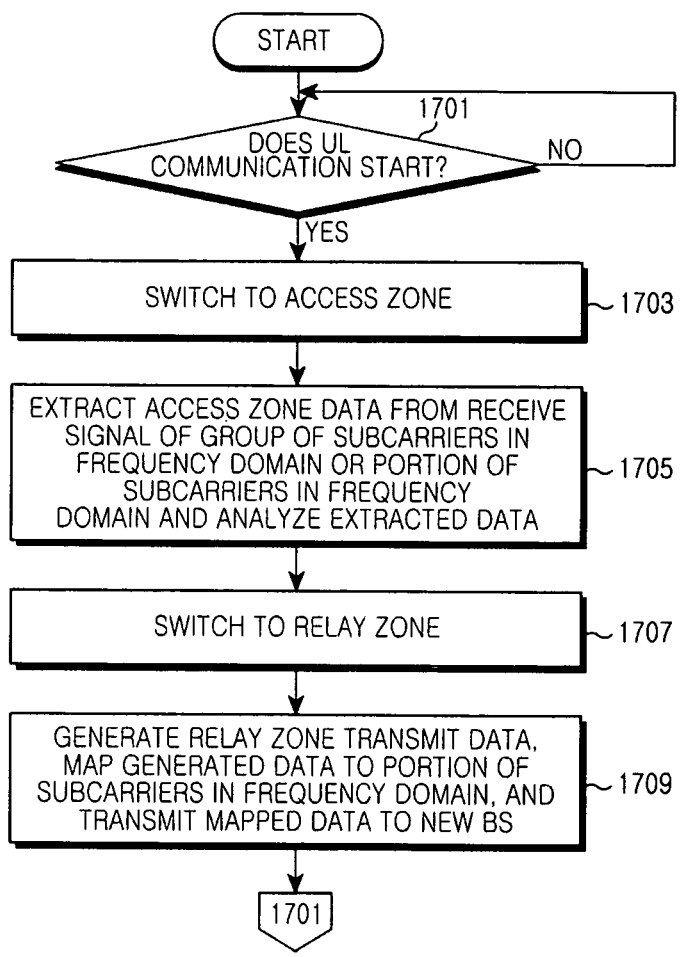
FIG. 17 is a flowchart illustrating a UL communication process of a legacy RS in a multi-hop relay wireless communication system accepting a different system according to an exemplary embodiment of the present invention.

FIG. 17 is a flowchart illustrating a UL communication process of a legacy RS in a multi-hop relay wireless communication system accepting a different system according to an exemplary embodiment of the present invention. A description of an operation of FIG. 17 is made below on the assumption that the legacy RS uses a UL subframe structure as in FIGS. 7 and 8.

Referring to FIG. 17, in step 1701, the legacy RS determines if UL communication starts. If the UL communication starts, in step 1703, the legacy RS switches to an access zone. That is, the legacy RS performs a preparation for access zone UL communication. After switching to the access zone, in step 1705, the legacy RS extracts access zone receive data from a receive signal of a group of subcarriers in the frequency domain (FIG. 7) or a portion of subcarriers in the frequency domain (FIG. 8) and analyzes the extracted access zone receive data through demodulation and decoding.

Then, if the access zone communication is completed, in step 1707, the legacy RS performs switching to a relay zone. That is, the legacy RS performs a preparation for relay zone UL communication. After switching to the relay zone, in step 1709, the legacy RS generates relay zone transmit data, maps the generated transmit data to a portion of subcarriers in the frequency domain, and transmits the mapped transmit data to a new BS. Then, if the relay zone communication is completed, the legacy RS returns to step 1701 to determine a next UL communication start.

An exemplary embodiment of the present invention is described assuming two hops in which one legacy RS exists between a new BS and a legacy MS. However, the present invention is equally applicable to a multi-hop environment in which one or more legacy RSs exist between a new BS and a legacy MS.

As described above, an exemplary embodiment of the present invention has an advantage of being able to efficiently provide a data service to all MSs following a different system by defining a frame structure for supporting a communication service for all entities of a heterogeneous system in a multi-hop relay wireless communication system.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for DownLink (DL) frame communication in a multi-hop relay wireless communication system supporting different standards, the method comprising:
   transmitting, by a Base Station (BS), DL data to at least one legacy Mobile Station (MS) having a direct link through a BS legacy access zone within a DL frame for the BS;
   transmitting, by a legacy Relay Station (RS), DL data to at least one legacy MS having a relay link through a first RS access zone within a DL frame for the legacy RS, wherein the legacy RS supports only a legacy standard;
   transmitting, by the BS, DL data to the legacy RS through a BS legacy relay zone within the DL frame for the BS;
   receiving, by the legacy RS, the DL data from the BS through a RS relay zone within the DL frame for the legacy RS; and
   transmitting, by the BS, DL data to only at least one new MS having the direct link through a BS new zone within the DL frame for the BS, wherein the BS legacy access zone and the first RS access zone are allocated in identical frequency-time resources, wherein the BS new zone and a second RS access zone are allocated in identical frequency-time resources, and wherein the DL frame includes a first zone and a second zone, the first zone including the BS legacy access zone, the first RS access zone, the BS legacy relay zone, the RS relay zone, and the second zone including the BS new zone and the second RS access zone.

2. The method of claim 1, further comprising:
inserting, by the legacy RS, a gap for mode conversion between the first RS access zone and the RS relay zone within the DL frame for the legacy RS.

3. A method for UpLink (UL) frame communication in a multi-hop relay wireless communication system supporting different standards, the method comprising:
receiving, by a Base Station (BS), UL data from at least one legacy Mobile Station (MS) having a direct link through a BS legacy access zone within a UL frame for the BS;
receiving, by a legacy Relay Station (RS), UL data from at least one legacy MS having a relay link through a first RS access zone within a UL frame for the legacy RS, wherein the legacy RS supports only a legacy standard;
receiving, by the BS, UL data from the legacy RS through a BS legacy relay zone within the UL frame for the BS;
transmitting, by the legacy RS, the UL data to the BS through a RS relay zone within the UL frame for the legacy RS; and
receiving, by the BS, UL data from only at least one new MS having the direct link through a BS new zone within the UL frame for the BS,
wherein the BS legacy access zone and the first RS access zone are allocated in identical frequency-time resources,
wherein the BS new zone and a second RS access zone are allocated in identical frequency-time resources, and
wherein the UL frame includes a first zone and a second zone, the first zone including the BS legacy access zone, the first RS access zone, the BS legacy relay zone, the RS relay zone, and the second zone including the BS new zone and the second RS access zone.

4. The method of claim 3, wherein the BS legacy access zone, the BS legacy relay zone, and the BS new zone are divisions based on a time division scheme.

5. The method of claim 3, wherein the BS legacy access zone and the BS legacy relay zone are divisions based on a time division scheme, and
wherein a BS legacy zone, comprising the BS legacy access zone and the BS legacy relay zone, and the BS new zone are divisions based on a frequency division scheme.

6. A multi-hop relay wireless communication system supporting different standards, the system comprising:
a Base Station (BS) transmitting DownLink (DL) data according to a DL frame for the BS; and
a legacy RS transmitting and receiving DL data according to a DL frame for the legacy RS, wherein the legacy RS supports only a legacy standard,
wherein the BS transmits DL data to at least one legacy Mobile Station (MS) having a direct link through a BS legacy access zone within the DL frame for the BS,
wherein the BS transmits DL data to the legacy RS through a BS legacy relay zone within the DL frame for the BS,
wherein the BS transmits DL data to only at least one new MS having the direct link through a BS new zone within the DL frame for the BS, wherein the legacy RS transmits DL data to at least one legacy MS having a relay link through a first RS access zone within the DL frame for the legacy RS,
wherein the legacy RS receives the DL data from the BS through a RS relay zone within the DL frame for the legacy RS,
wherein the BS legacy access zone and the first RS access zone are allocated in identical frequency-time resources,
wherein the BS new zone and a second RS access zone are allocated in identical frequency-time resources, and
wherein the UL frame includes a first zone and a second zone, the first zone including the BS legacy access zone, the first RS access zone, the legacy relay zone, the RS relay zone, and the second zone including the BS new zone and the second RS access zone.

7. The system of claim 6, wherein the BS legacy access zone, the BS legacy relay zone, and the BS new zone are divisions based on a time division scheme.

8. A multi-hop relay wireless communication system supporting different standards, the system comprising:
a Base Station (BS) receiving Uplink (UL) data according to a UL frame for the BS; and
a legacy RS transmitting and receiving UL data according to a UL frame for the legacy RS, wherein the legacy RS supports only a legacy standard,
wherein the BS receives UL data from at least one legacy Mobile Station (MS) having a direct link through a BS legacy access zone within the UL frame for the BS,
wherein the BS receives UL data from the legacy RS through a BS legacy relay zone within the UL frame for the BS,
wherein the BS receives UL data from only at least one new MS having the direct link through a BS new zone within the UL frame for the BS,
wherein the legacy RS receives UL data from at least one legacy MS having a relay link through a first RS access zone within the UL frame for the legacy RS,
wherein the legacy RS transmits the UL data to the BS through a RS relay zone within the UL frame for the legacy RS,
wherein the BS legacy access zone and the first RS access zone are allocated in identical frequency-time resources,
wherein the BS new zone and a second RS access zone are allocated in identical frequency-time resources, and
wherein the DL frame includes a first zone and a second zone, the first zone including the BS legacy access zone, the first RS access zone, the BS legacy relay zone, the RS relay zone, and the second zone including the BS new zone and the second RS access zone.

9. The method of claim 1, further comprising:
transmitting, by the legacy RS, DL data to at least one legacy MS having the relay link through the second RS access zone within the DL frame for the legacy RS.

10. The method of claim 1, wherein the BS legacy access zone, the BS legacy relay zone, and the BS new zone are divisions based on a time division scheme.

11. The method of claim 3, further comprising:
receiving, by the legacy RS, UL data from at least one legacy MS having the relay link through the second RS access zone within the UL frame for the legacy RS.

12. The system of claim 6, wherein the legacy RS transmits DL data to at least one legacy MS having the relay link through the second RS access zone within the DL frame for the legacy RS.

13. The system of claim 8, wherein the BS legacy access zone and the BS legacy relay zone are divisions based on a time division scheme, and wherein a BS legacy zone, comprising the BS legacy access zone and the BS legacy relay zone, and the BS new zone are divisions based on a frequency division scheme.

14. The system of claim 8, wherein the legacy RS receives UL data from at least one legacy MS having the relay link through the second RS access zone within the UL frame for the legacy RS.

15. The system of claim 8, wherein the BS legacy access zone, the BS legacy relay zone, and the BS new zone are divisions based on a time division scheme.

* * * * *